(12) United States Patent
Wang

(10) Patent No.: US 9,128,301 B2
(45) Date of Patent: Sep. 8, 2015

(54) ASSEMBLY STRUCTURE FOR SUBSIDIARY FRAME OF EYEGLASSES

(71) Applicant: Chih-Hung Wang, Tainan (TW)

(72) Inventor: Chih-Hung Wang, Tainan (TW)

(*) Notice: Subject to any disclaimer, the term of this patent is extended or adjusted under 35 U.S.C. 154(b) by 186 days.

(21) Appl. No.: 13/853,182

(22) Filed: Mar. 29, 2013

(65) Prior Publication Data
US 2014/0293214 A1    Oct. 2, 2014

(51) Int. Cl.
*G02C 5/12* (2006.01)
*G02C 9/04* (2006.01)
*G02C 5/02* (2006.01)

(52) U.S. Cl.
CPC .. *G02C 9/04* (2013.01); *G02C 5/02* (2013.01); *G02C 5/12* (2013.01); *G02C 2200/04* (2013.01)

(58) Field of Classification Search
CPC ............ G02C 1/10; G02C 5/12; G02C 5/126; G02C 2200/08
USPC ............................... 351/41, 131–136, 83, 103
See application file for complete search history.

(56) References Cited

U.S. PATENT DOCUMENTS 5,412,438 A * 5/1995 Bolle' .............................. 351/44

FOREIGN PATENT DOCUMENTS

TW    437968    1/1990
TW    269465 M    1/1994

* cited by examiner

*Primary Examiner* — Huy K Mai
(74) *Attorney, Agent, or Firm* — Rosenberg, Klein & Lee

(57) ABSTRACT

An assembly structure for subsidiary frame of eyeglasses is provided. A nose pad bracket provided on an eyeglasses major body has an engaging portion having female snap-fit portions provided at both sides thereof to fit with male snap-fit portions on the subsidiary frame. Further, an abutting segment is extended from the surface of a recessed portion on the subsidiary frame in such a manner as to fit with a recessed groove provided on a protruding portion of a nose bridge section of the subsidiary frame. Therefore, one side of the subsidiary frame is pressed against the lenses of the eyeglasses major body and the other side is firmly abutted with the protruding portion, so as to achieve firm positioning of the subsidiary frame and to protect the subsidiary frame from fall off in using.

3 Claims, 4 Drawing Sheets

ASSEMBLY STRUCTURE FOR SUBSIDIARY FRAME OF EYEGLASSES

BACKGROUND OF THE INVENTION

1. Fields of the Invention

The present invention relates to an assembly structure for subsidiary frame of eyeglasses, particularly to an assembly structure for subsidiary frame of eyeglasses, in which a firm and stable combination between an eyeglasses major body and the subsidiary frame is achieved by the provision of mutual fitting and mutual abutment therebetween.

2. Descriptions of Related Art

According to conventional concept, people having myopia or particular demand are necessary to wear glasses. However, as the contemporary eyeglasses developed by the eyeglasses makers are relatively diversified and fashionized, eyeglasses are no more exclusive articles of people having myopia, but become fashion accessories instead. With the diversification of glasses frame design, eyeglasses not only alter with fashion change but also create popular trend. Consumers can purchase eyeglasses according to their favorite or purpose of use, such as vision correction eyeglasses, sunglasses, sports glasses. People tend to choose eyeglasses of different shape, color or pattern as fashion mix, so as to create varied and unique personal style.

People having myopia under too strong sunlight condition can't but to wear myopia glasses only in order to see things clearly, but cannot wear sunglass simultaneously to avoid possible damage caused by ultra violet light. Thus, people having myopia often wear myopia glasses attached with sunglasses under too strong sunlight condition so as to protect the eyes from strong sunlight. In a Taiwanese Patent Gazette No. 437968 entitled "Improvement of Attraction Type Subsidiary Frame (I)", magnets are respectively provided on a main frame and a subsidiary frame so as to achieve mutual attraction. In another Taiwanese Patent Gazette No. M269465 entitled "Eyeglasses Structure Having Subsidiary Frame (II)", a first slot is provided at rear side of nose middle portion for fitting with an insert provided correspondingly on the subsidiary frame for firm fixation of the subsidiary frame on the main frame; on the other hand, a second slot for firm fixation of a nose pad is formed on a step segment which is provided on an end of a nose middle portion opposite to the end corresponding to the insert, the nose middle portion heading rearward is formed on the rear side of the subsidiary frame with respect to the nose middle part of the main frame.

The above structures are substantially used in the case of assembling an optical frame for myopia lenses on sunglasses, and are limited in the case of assembling the main frame and the subsidiary frame by magnets attraction or by slot-insert fitting. However, magnets attraction or slot-insert fitting tend to fall off during moving or swaying of human body. Therefore, above conventional structures have the defect of incapable of fixing the subsidiary frame firmly in position.

In view of the above defects, the inventor of this invention thus proposes a new assembly structure for subsidiary frame of eyeglasses according to research and improvement made with respect to the conventional structures, based on his experience and the knowledge accumulated in the long term involvement of relevant field, so as to achieve better value in practical implementation.

SUMMARY OF THE INVENTION

The main object of this invention is to provide an assembly structure for subsidiary frame of eyeglasses, in which a firm and stable combination between an eyeglasses major body and a subsidiary frame is achieved by the provision of mutual fitting and abutment therebetween.

The objects and effects of the assembly structure for subsidiary frame of eyeglasses of the present invention are achieved by the following technical contents.

A nose pad bracket provided on the eyeglasses major body has an engaging portion having female snap-fit portions provided at both sides thereof to fit with male snap-fit portions on a subsidiary frame. Further, an abutting segment is extended from the surface of a recessed portion on the subsidiary frame in such a manner as to fit with a recessed groove provided on a protruding portion of a nose bridge section of the subsidiary frame. Therefore, one side of the subsidiary frame is pressed against the lenses of the eyeglasses major body and the other side is firmly abutted with the protruding portion, so as to achieve firm positioning of the subsidiary frame and to protect the subsidiary frame from fall off in use.

According to the assembly structure for subsidiary frame of eyeglasses of the present invention, the lenses of the eyeglasses major body is an integral type lens which is fitted into a groove on one side of the engaging segment of the nose pad bracket for abutment with the subsidiary frame.

BRIEF DESCRIPTION OF THE DRAWINGS

The present invention will be better understood by the detailed description of preferred embodiments with reference to the accompanied drawings, in which.

DETAILED DESCRIPTION OF THE PREFERRED EMBODIMENTS

The technical contents, objects and effect of the present invention will become more apparent by the detailed description in conjunction with the accompanied drawings.

Figure 1:
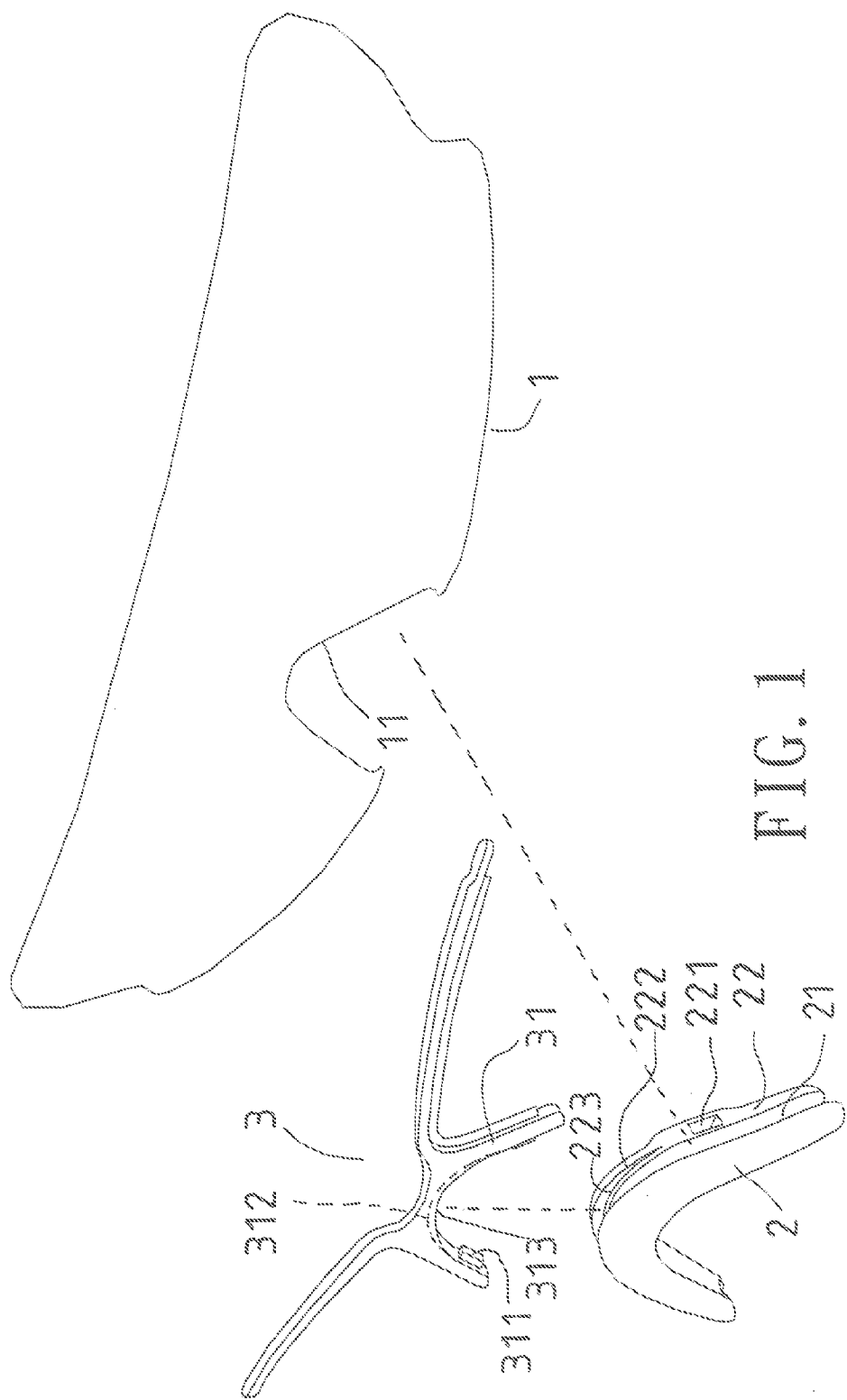
FIG. 1 is a perspective exploded schematic view of the present invention.
Figure 2:
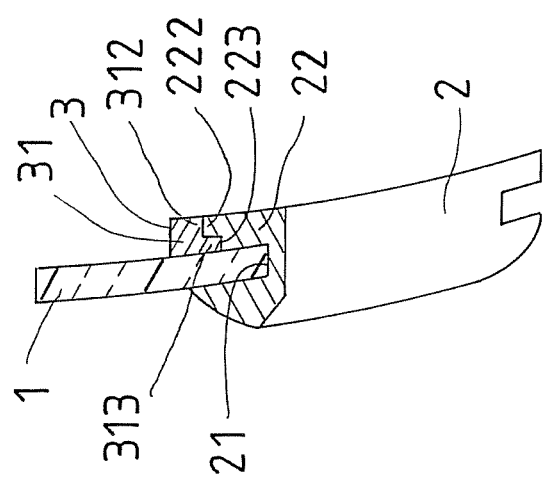
FIG. 2 is a schematic sectional view of the present invention.
Figure 3:
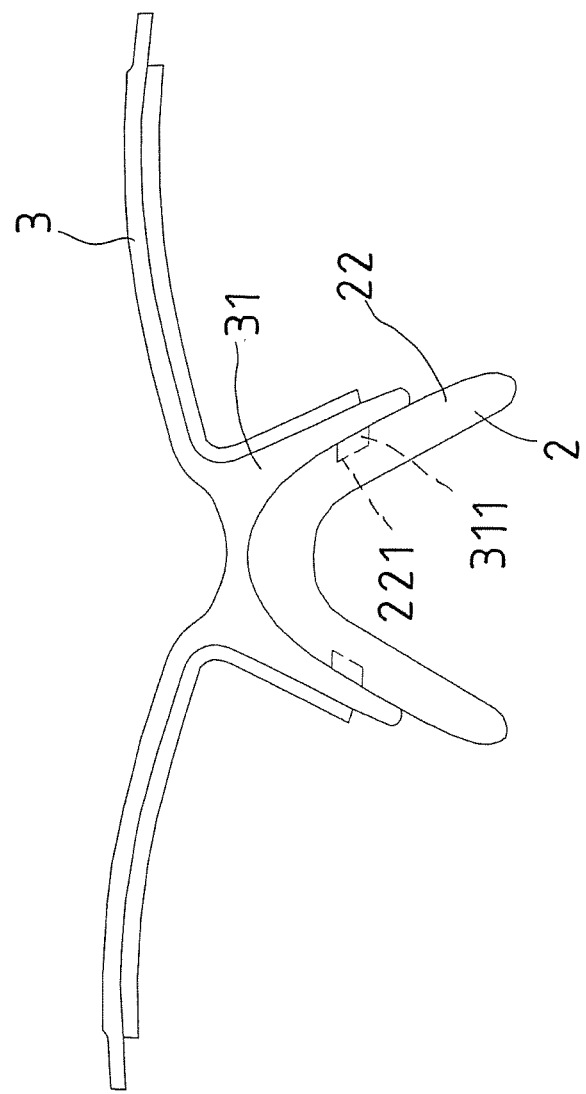
FIG. 3 is a schematic front view of the present invention.

Firstly referring to FIGS. 1 and 2, the assembly structure for subsidiary frame of eyeglasses of the present invention comprises:

an eyeglasses major body (1);

a nose pad bracket (2) having a groove (21) for correspondingly fitting with the eyeglasses major body (1) and an engaging segment (22) having female snap-fit portions (221) provided at both sides thereof, a protruding portion (222) being formed on the top end of the engaging segment (22) and a recessed groove (223) being provided on the protruding portion (222);

a subsidiary frame (3) having a nose bridge section (31) corresponding to the engaging segment (22) of the nose pad bracket (2), male snap-fit portions (311) for fitting with the female snap-fit portions (221) of the engaging segment (22) being provided on the nose bridge section (31), a recessed portion (312) corresponding to the protruding portion (222) of the engaging segment (22) being provided on the subsidiary frame (3), and an abutting segment (313) being extended in such a manner as to correspond to the recessed groove (223) of the protruding portion (222).

Figure 4:
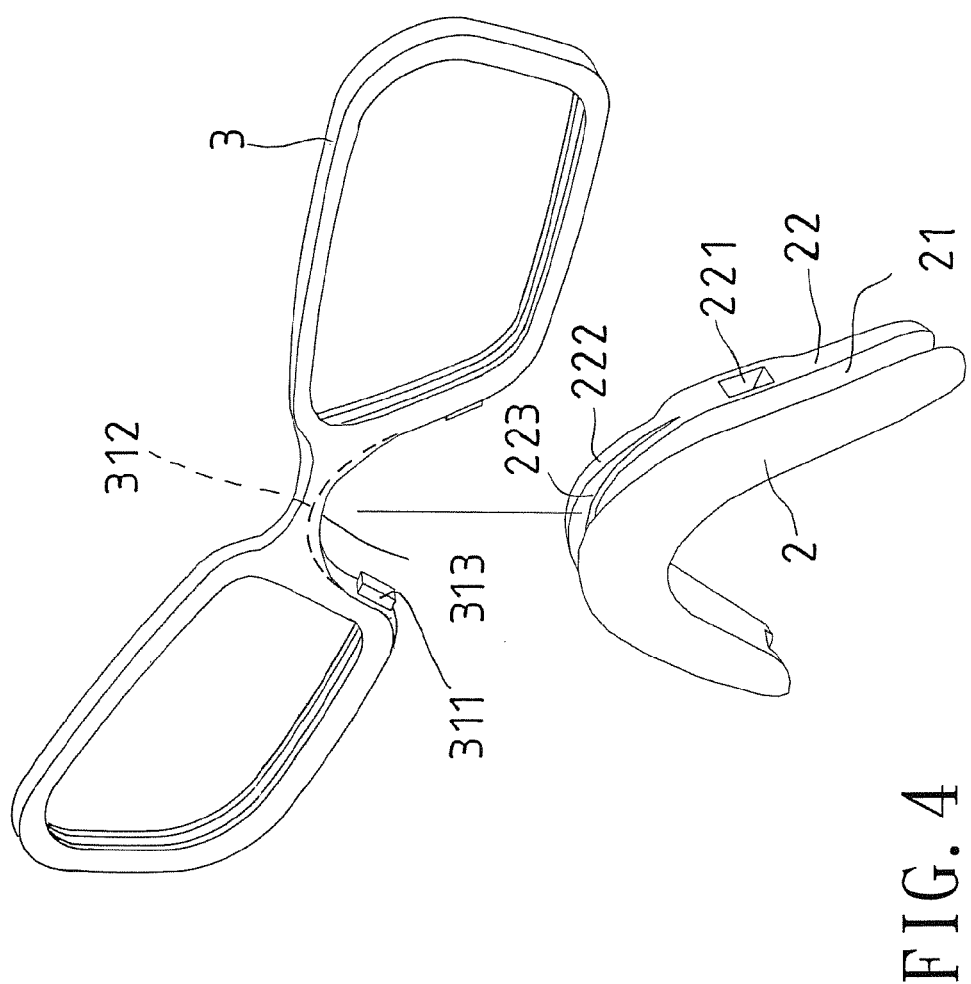
FIG. 4 is a schematic sectional view of another embodiment of the present invention.

Referring to FIGS. 1 to 4, in assembling the assembly structure for subsidiary frame of eyeglasses of the present invention, a nose pad bracket (2) is fitted on a nose bridge section (11) of the eyeglasses major body (1), which can be the eyeglasses major body (1) having integral type lenses, by fitting the eyeglasses major body (1) into the groove (21) of the nose pad bracket (2). Next, the subsidiary frame (3), which can be a half-frame type or a full-frame type as shown in FIG. 1 or 4, is to be assembled with the combination of the eyeglasses major body (1) and the nose pad bracket (2). The nose bridge section (31) of the subsidiary frame (3) is fitted with the engaging segment (22) of the nose pad bracket (2) in such a manner that the male snap-fit portions (311) of the nose bridge section (31) is fitted with the female snap-fit portions (221) of the engaging segment (22), simultaneously the protruding portion (222) of the engaging segment (22) is correspondingly fitted with the recessed portion (312) of the nose bridge section (31) of the subsidiary frame (3) and the recessed groove (223) of the protruding portion (222) is fitted with the abutting segment (313) of the subsidiary frame (3). In this manner, one side of the subsidiary frame (3) is pressed against the lenses of the eyeglasses major body (1), while the other side of the subsidiary frame (3) is firmly positioned by the fitting between the abutting segment (313) and the protruding portion (222) so as to protect the lenses from fall off in use.

It is apparent from the above description of constitution and implementation, present invention has the following advantages comparing with conventional structures.

1. In the assembly structure for subsidiary frame of eyeglasses of the present invention, by the mutual fitting of step-like convex and concave portions between the eyeglasses major body and the subsidiary frame, one side of the subsidiary frame is pressed against the eyeglasses major body, while the other side of the subsidiary frame is firmly located in position by the fitting between the abutting segment and the protruding portion, so as to protect the subsidiary frame from falling off in use.

2. In the assembly structure for subsidiary frame of eyeglasses of the present invention, by the mutual fitting between the female snap-fit portions and the male snap-fit portions, the subsidiary frame can be firmly positioned on the eyeglasses major body, so as to protect the subsidiary frame from falling off in use and to achieve the effect of easy assembling.

Additional advantages and modifications will readily occur to those skilled in the art. Therefore, this invention in its broader aspects is not limited to the specific details and representative embodiment shown and described herein. Accordingly, various modifications and variations may be made without departing from the spirit and scope of the general inventive concept as defined by the appended claims and their equivalents.

What is claimed is:

1. An assembly structure for subsidiary frame of eyeglasses, comprising:

an eyeglasses major body;

a nose pad bracket having a groove correspondingly fitted by said eyeglasses major body and an engaging segment, said engaging segment having a pair of first recessed portions defining female snap-fit portions provided at both sides thereof, a protruding portion being formed on the top end of said engaging segment and a recessed groove being provided on said protruding portion;

a subsidiary frame having a nose bridge section corresponding to said engaging segment of said nose pad bracket, a pair of protrusions defining male snap-fit portions for matingly engaging the female snap-fit portions of said engaging segment being provided on said nose bridge section, a second recessed portion corresponding to said protruding portion of said engaging segment being provided on said subsidiary frame, and an abutting segment being extended in such a manner as to correspond to said recessed groove of said protruding portion;

wherein said pair of protrusions and said second recessed portion matingly respectively engage said pair of first recessed portions and said protruding portion to secure said subsidiary frame to said nose pad bracket.

2. The assembly structure for subsidiary frame of eyeglasses as claimed in claim 1, wherein said eyeglasses major body is an eyeglasses major body having integral type lenses.

3. The assembly structure for subsidiary frame of eyeglasses as claimed in claim 1, wherein said subsidiary frame is a half-frame type or a full-frame type subsidiary frame.

* * * * *